United States Patent
Shah et al.

(10) Patent No.: US 7,539,827 B2
(45) Date of Patent: May 26, 2009

(54) SYNCHRONIZATION OF CHANGE-TRACKED DATA STORE WITH DATA STORE HAVING LIMITED OR NO CHANGE TRACKING

(75) Inventors: Ashish B. Shah, Sammamish, WA (US); Edward Eric Thomas, Redmond, WA (US); Kevin R. Hughes, Coupeville, WA (US); Lev Novik, Bellevue, WA (US); Neil Leonard Padgett, Redmond, WA (US); Salome Jacob, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 233 days.

(21) Appl. No.: 11/488,971

(22) Filed: Jul. 19, 2006

(65) Prior Publication Data

US 2008/0022057 A1    Jan. 24, 2008

(51) Int. Cl.
G06F 12/00 (2006.01)
G06F 17/30 (2006.01)
(52) U.S. Cl. .................. 711/162; 707/203; 707/204; 707/E17.052
(58) Field of Classification Search ............... 711/162; 707/203, 204, E17.052
See application file for complete search history.

(56) References Cited

U.S. PATENT DOCUMENTS

| | | | |
|---|---|---|---|
| 6,973,464 B1 | 12/2005 | Gao | 707/201 |
| 7,003,587 B1 | 2/2006 | Battat et al. | 709/277 |
| 2002/0194207 A1 | 12/2002 | Bartlett et al. | 707/203 |
| 2004/0193660 A1 | 9/2004 | Gagne et al. | 707/204 |
| 2005/0044108 A1 | 2/2005 | Shah et al. | 707/104.1 |
| 2005/0044187 A1 | 2/2005 | Jhaveri et al. | 709/219 |
| 2005/0187993 A1 | 8/2005 | Selman et al. | 707/204 |
| 2005/0188254 A1 | 8/2005 | Urabe et al. | 714/6 |
| 2005/0198452 A1 | 9/2005 | Watanabe | 711/162 |
| 2005/0198453 A1 | 9/2005 | Osaki | 711/162 |
| 2005/0256907 A1 | 11/2005 | Novik et al. | 707/200 |
| 2006/0041596 A1 | 2/2006 | Stirbu et al. | 707/200 |

OTHER PUBLICATIONS

Olías, I.G., "Security and Auto-Configuration of Location Servers for IP Telephony", Master's Thesis, Mar. 2002, *Helsinki University of Technology, Department of Electrical and Communications Engineering Network Laboratory*, http://www.netlab.tkk.fi/tutkimus/imelio/papers/VOIP/IgnacioMT.pdf, 127 pages.

(Continued)

*Primary Examiner*—Hyung S Sough
*Assistant Examiner*—Mehdi Namazi
(74) *Attorney, Agent, or Firm*—Woodcock Washburn LLP

(57) ABSTRACT

A data store in which changes are not tracked is synchronized with a data store in which changes are tracked utilizing a shadow store. The shadow store contains shadow data indicative of the most recent synchronization operation between the data stores. The shadow data comprises hash values of the data items in the limited or non-change-tracked data store. Changes to data items in the limited or non-change-tracked data store are operated on to provide respective hash values. The hash values are compared with the hash values in the shadow data. If the hash values differ, changes are appropriately applied to the data store, and the shadow data is appropriately updated. In an example embodiment, hash values are obtained from one-way hash functions, such MD5, SHA-1, SHA-256, or the like.

20 Claims, 7 Drawing Sheets

OTHER PUBLICATIONS

Olías, I.G., "Security and Auto-Configuration of Location Servers for IP Telephony". Master's Thesis, Mar. 2002, *Helsinki University of Technology, Department of Electrical and Communications Engineering Networking Laboratory*, http://www.netlab.tkk.fi/tutkimus/imelio/papers/VOIP/IgnacioMT.pdf, 127 pages.

Reed, D.P., "Implementing Atomic Actions on Decentralized Data", *ACM Transactions on Computer Systems*, 1983, 1(1), 3-23.

Data Connection Directory Systems-Directories Explained, http://dataconnection.com/inetapps/direxpl.htm, 1998-2005 Data Connection LTD, 7 pages.

"Synchronizing Data between WinFS Stores", http://blogs.msdn.com/winfs/archive/2006/01/25/517674,apx, 2006, 4 pages.

SYNCHRONIZATION OF CHANGE-TRACKED DATA STORE WITH DATA STORE HAVING LIMITED OR NO CHANGE TRACKING

TECHNICAL FIELD

The technical field generally relates to synchronization and more specifically relates to synchronization between a system that tracks changes and a system that does not track changes.

BACKGROUND

Synchronization ensures that designated data from multiple data stores are consistent. Typical synchronization systems ship changes between data stores and reconcile the changes if conflicts exist. Not all systems and devices in use today were designed to implement change-based synchronization and hence these devices do not track changes. In other cases, these stores do not track changes at the granularity, or resolution, required for synchronization Thus synchronizing data stores between systems that track changes in a data store and systems that do not adequately track changes in a data store is problematic.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A mechanism is provided to allow data stores having limited or no change tracking to be synchronized with data stores in which changes are tracked. Data from the limited/non-change-tracked data store is operated on to determine changes for the store. A representation of the operated on data is stored in storage referred to as a shadow store, and the data stored therein is referred to as shadow data. The representation is other than an identical copy of the data. In an example embodiment, the data is operated on by a one-way hash function, such MD5, SHA-1, SHA-256, or the like, and the results of the operations, hash values, are stored in the shadow store as shadow data. In an example embodiment, if the data structure provided to the hash function is decomposable into components, the individual components are operated on by the hash function, and the results are combined. The combined and individual results are stored in the shadow store as shadow data. During synchronization, the shadow data is utilized to determine if a change has occurred in the limited/non-tracked data store. If changes have occurred, the shadow store is updated appropriately and the limited/non-change-tracked data store is synchronized with the change-tracked data store. The shadow data is also maintained when synchronizing changes from the change-tracked store to the limited/non-change-tracked data store for successfully transferred changes. In both cases, the shadow data reflects the state of the limited/non-change-tracked store as of the most recent synchronization operation. Operations involving the shadow store are transparent to a user, such that the user is not made aware of read and write operations to the shadow store.

BRIEF DESCRIPTION OF THE DRAWINGS

The foregoing summary, as well as the following detailed description, is better understood when read in conjunction with the appended drawings. For the purpose of illustrating synchronization of a change-tracked data store with a limited or non-change-tracked data store, there is shown in the drawings exemplary constructions thereof; however, synchronization of a change-tracked data store with a limited or non-change-tracked data store is not limited to the specific methods and instrumentalities disclosed.

DETAILED DESCRIPTION OF ILLUSTRATIVE EMBODIMENTS

Figure 1:
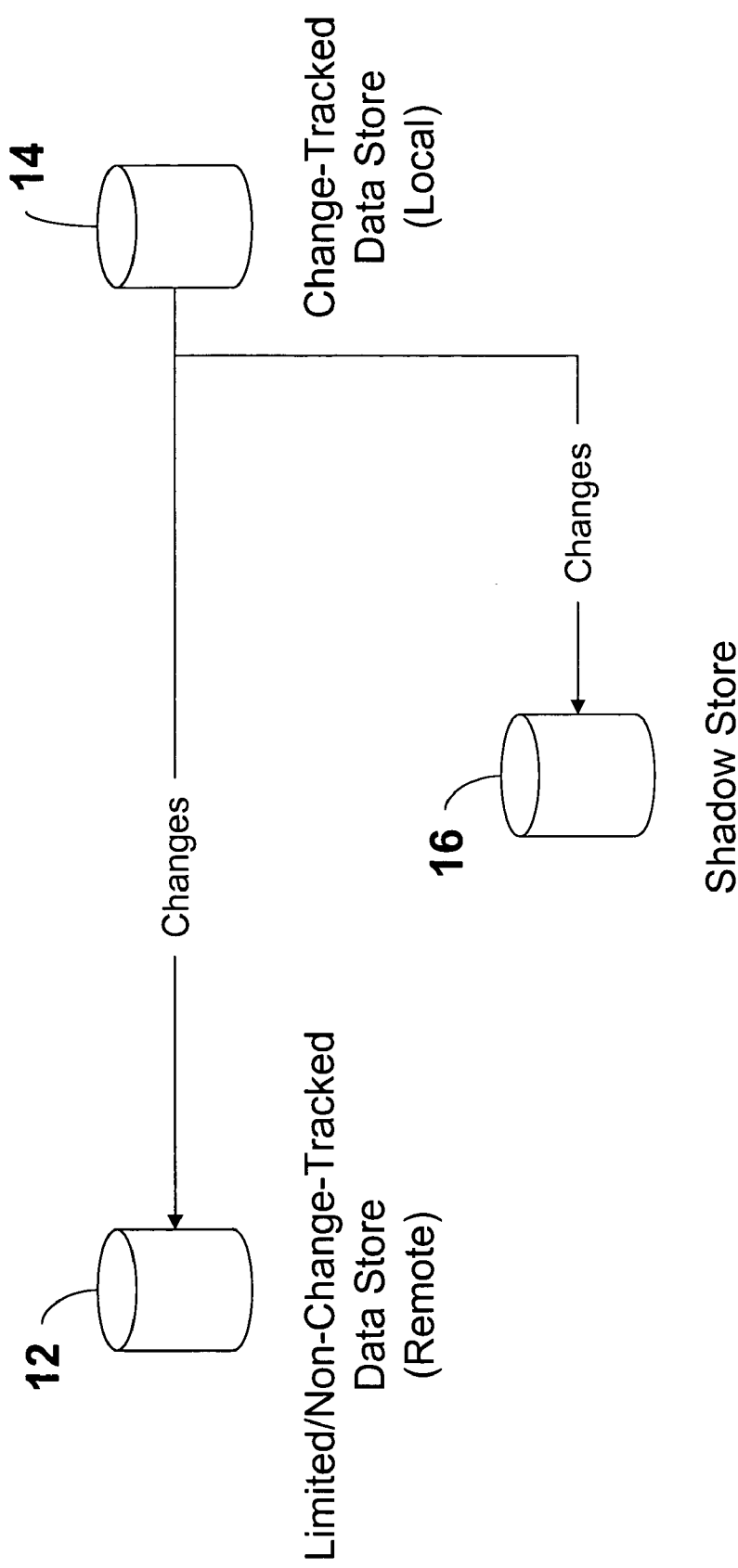
FIG. 1 illustrates synchronization from the change-tracked data store to the limited/non-change-tracked data store.

Synchronization of a change-tracked data store with a limited/non-change-tracked data store occurs in two directions. In one direction, data is sent from the change-tracked data store to the limited/non-change-tracked data store. In the other direction, data is sent from the limited/non-change-tracked data store to the change-tracked data store. In FIG. 1, the limited/non-change-tracked data store 12 receives data from the change-tracked data store 14. Synchronization includes determining what changes have occurred on a data store and applying those changes to another data store. As described in more detail below, as changes are applied to the limited/non-change-tracked data store 12, the shadow store 16 is appropriately updated. In accordance with an example embodiment, the shadow store 16 is utilized to store data, referred to as shadow data. Shadow data is indicative of the data stored in the limited/non-change-tracked data store 12.

Figure 2:
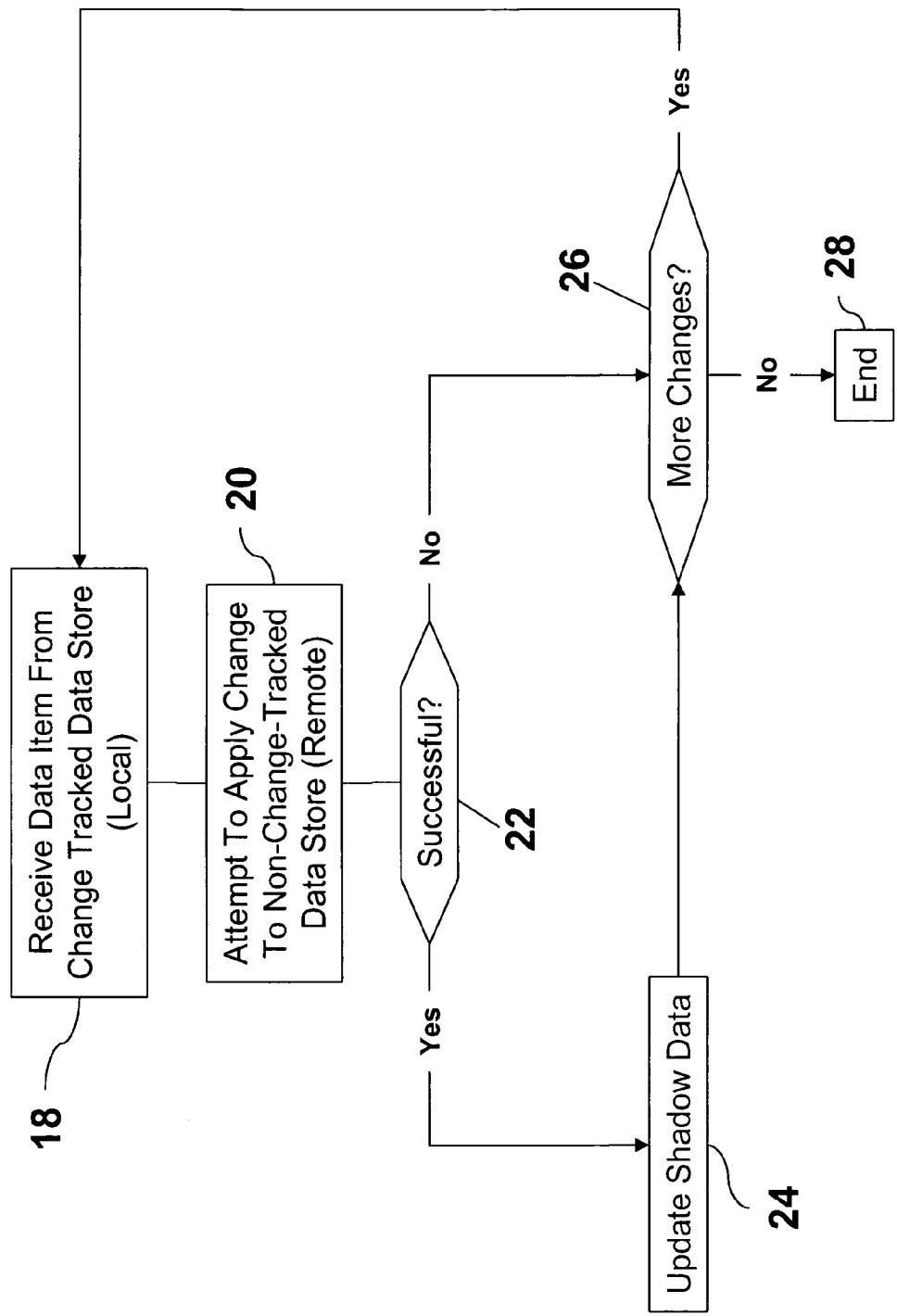
FIG. 2 is a flow diagram of an example process for synchronizing from the change-tracked data store to the limited/non-change-tracked data store.

FIG. 2 is a flow diagram of an example process for synchronizing from the change-tracked data store 14 to the limited/non-change-tracked data store 12, as depicted in FIG. 1. The process depicted in FIG. 2 is described with reference to the example illustration depicted in FIG. 1. At step 18, a data item comprising a change is received from the change-tracked data store 14. The change is attempted to be applied to the limited/non-change-tracked data store 12 at step 20. If the application of the change to the limited/non-change-tracked data store 12 is successful (step 22), the shadow data in the shadow store 16 is updated to reflect the change. Shadow data comprises an indication of the state of the limited/non-changed-tracked data store as of the most recent synchronization operation. As changes are successfully applied to the limited/non-change-tracked data store 12, the shadow data is updated to reflect the changes. At step 26, it is determined if there are more changes to be applied to the limited/non-change-tracked data store 12. If there are more changes to be applied (step 26), the process proceeds to step 18 and continues therefrom. If there are no more changes to be applied (step 26), the process ends at step 28.

If the attempted application of the change to the limited/non-change-tracked data store 12 is not successful (step 22), the shadow data is not updated. The process proceeds to step 26 and continues therefrom as described above. The shadow data is indicative of the most recent successful synchronization operation. This condition is maintained even if the synchronization process is interrupted, and all changes are not successfully applied.

Figure 3:
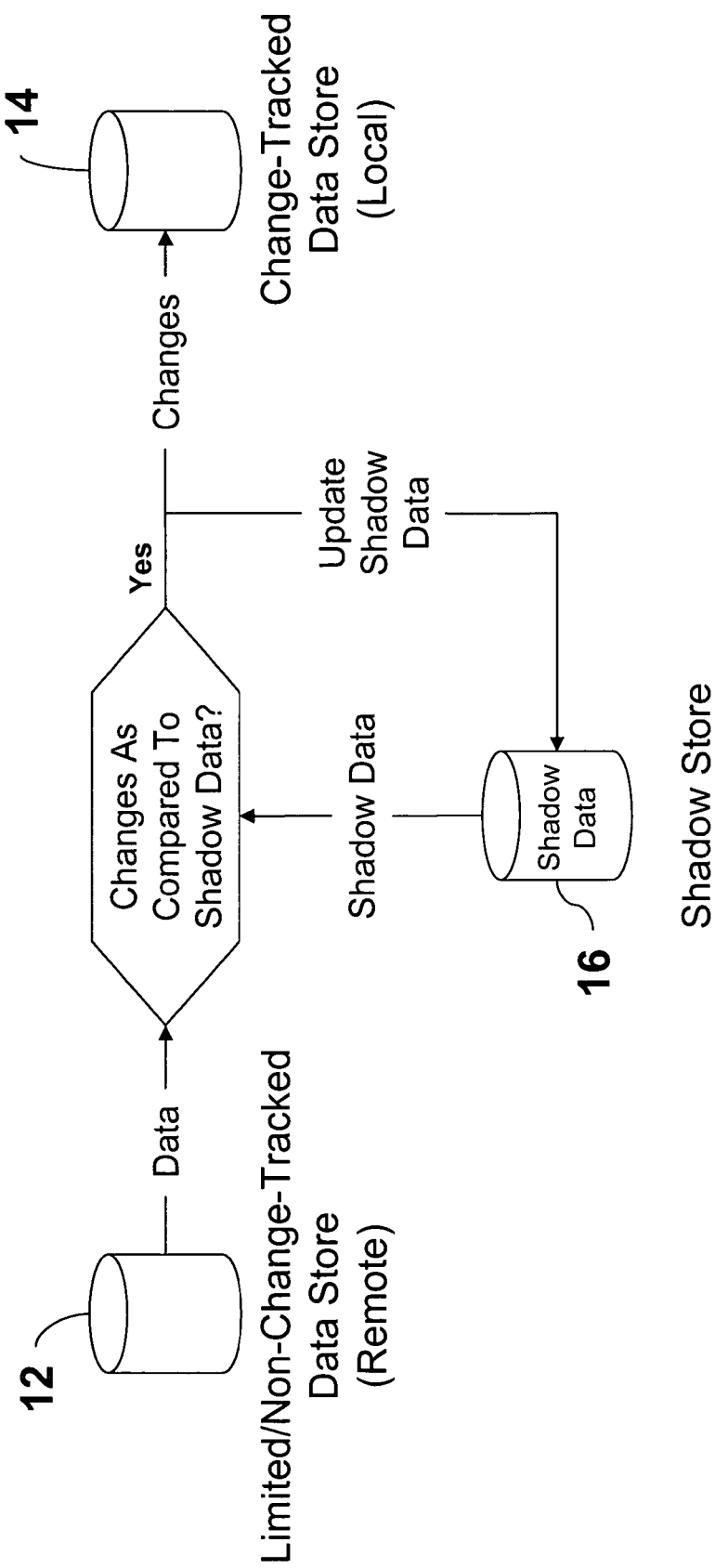
FIG. 3 illustrates synchronization from the limited/non-change-tracked data store to the change-tracked data store.

FIG. 3 is an illustration of synchronization from the limited/non-change-tracked data store 12 to the change-tracked data store 14. To synchronize the change-tracked data store 14 with changes that have occurred, or potentially have occurred, in the limited/non-change-tracked data store 12, the data provided from the limited/non-change-tracked data store 12 is compared with shadow data. If the comparison indicates that changes have occurred in the limited/non-change-tracked data store 12, the changes are applied to the change-tracked data store 14, and the shadow store is appropriately updated. This comparison is a "data-wise" comparison (recall shadow data comprises a representation of data values.) In an example embodiment the comparison is between hashes of data values. It is emphasized that the comparison of hash values is exemplary, and that any appropriate data-wise comparison could be employed, such as direct-binary-comparison (bit-wise), hash comparison, or any other comparison whose result is dependent on the data values or the system's representation thereof. If no changes have occurred, no changes are applied to the change-tracked data store 14, and the shadow store 16 is not updated. Thus, enumerated changes from the limited/non-change-tracked data store 12 are compared against the shadow data stored in the shadow store 16, and detected changes result in the shadow data being updated and the change-tracked data store being updated. The shadow data is indicative of the most recent synchronization operation between the limited/non-change-tracked data store 12 and the change-tracked data store 14.

Figure 4:
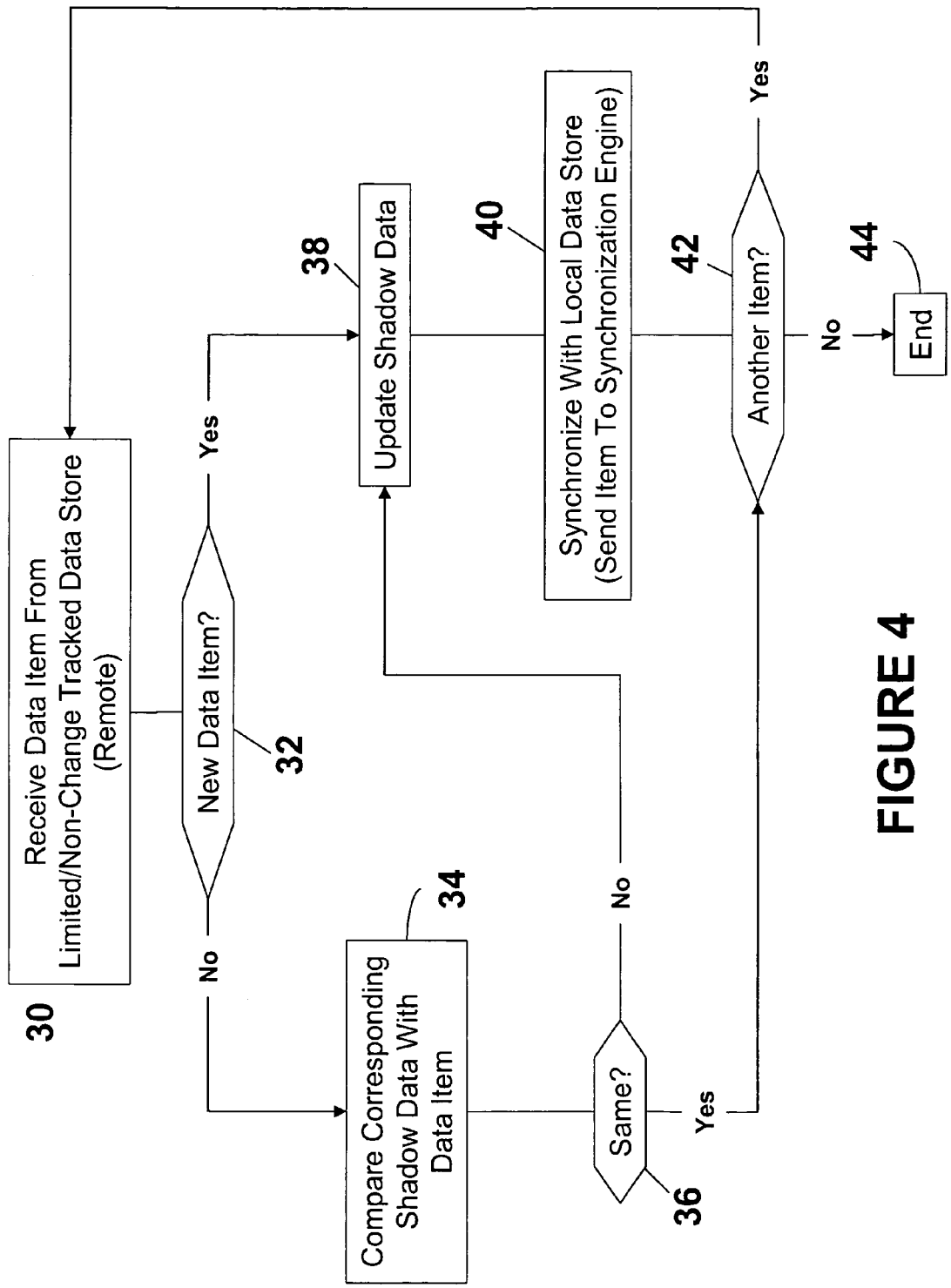
FIG. 4 is a flow diagram of an example process for synchronizing from the limited/non-change-tracked data store to the change-tracked data store.

FIG. 4 is a flow diagram of an example process for synchronizing from the limited/non-change-tracked data store 12 to the change-tracked data store 14, as depicted in FIG. 3. The process depicted in FIG. 4 is described with reference to the example illustration depicted in FIG. 3. Changes that have occurred in the limited/non-change-tracked data store 12, are applied to the change-tracked data store 14 and the shadow store 16 is appropriately updated. At step 30, a data item is received from the limited/non-change-tracked data store 12. At step 32, it is determined if the data item received from the limited/non-change-tracked data store 12 is new. A new data item is a data item that was not in the data set of a previous synchronization operation, and hence is not represented in the shadow storage.

If the data item received from the limited/non-change-tracked data store 12 is determined not to be new (step 32), the received data item is compared with the shadow data corresponding to the data item at step 34 to determine if there are any changes. In an example embodiment, as described in more detail below, the comparison is accomplished utilizing hash functions. If there are no changes (step 36) between the received data item and the corresponding shadow data, it is determined at step 42 if there are more data items to be received from the limited/non-change-tracked data store 12. If there are more data items (step 42), the process proceeds to step 30 and continues therefrom. If there are no more data items (step 42), the process stops at step 44.

If, at step 36, it is determined that a change has occurred (i.e., the received data item differs from the shadow data corresponding to the data item), the shadow data in the shadow store 16 is updated at step 38. In an example embodiment, as described in more detail below, the shadow data is updated utilizing hash functions. At step 40, the change is applied to the change-tracked data store 14. In an example embodiment, the change along with any appropriate information is provided to a synchronization engine for synchronizing the change-tracked data store 14. In an example embodiment, the change to the data stores and shadow data are atomic, so that the relationship between the two (the shadow data represents the state of the limited/non-change-tracked store as of the most recent synchronization operation) is maintained. In an example embodiment, this atomicity is obtained by using the transaction primitive common to most modern database management systems. The process proceeds to step 42 to determine if there are more data items, and continues as described above.

If, at step 32, it is determined that the data item is new (i.e., the data item was not in the previous synchronization data set as indicated by the shadow data in the shadow store), the shadow data in the shadow store 16 is updated at step 38. In an example embodiment, as described in more detail below, the shadow data is updated utilizing hash functions. The process then continues therefrom as describe above.

Shadow data can be stored in any appropriate format. In an example embodiment, shadow data comprises a copy of the limited/non-change-tracked data store (limited/non-changed tracked). Thus, in accordance with this example embodiment, data items received from data stores are compared with copies of respective data items stored in the shadow store, and updating to shadow data comprises updating the copy of the data item in the shadow data.

In another example embodiment, shadow data comprises a representation of the data stored in the limited/non-change-tracked data store. The representation can comprise an appropriate representation such as, for example, hash values of the data stored in the limited/non-change-tracked data store. In an example embodiment, the shadow data comprises values (e.g., hash values) indicative of data items and changes thereto. A hash value is the result of an operation on data by a hash function. In an example embodiment, the data stored in the limited/non-change-tracked data store is operated on by a one-way hash function, such as MD5, SHA-1, SHA-256, or the like, for example. A hash function is a function that transforms a variable-size input into a fixed size output. Often, hash functions are one way, meaning that it is impracticable or impossible to determine the input value from the output (transformed) value. The output value of a hash function is referred to a hash value. Provided the same input value, a hash function will result in the same hash (output) value. Within mathematical limits, two different inputs to a hash function will not result in the same hash value. Because hash values are fixed length values, shadow data comprising hash values of the data stored in the limited/non-change-tracked data store requires less storage (e.g., memory space) than shadow data comprising a mirror image of the data stored in the limited/non-change-tracked data store. Also, because the input to a hash value can be uniquely identified by its hash value (e.g., similar to a fingerprint), within mathematical limits, hash values can be utilized to detect changes in the data stored in the limited/non-change-tracked data store.

Figure 5:
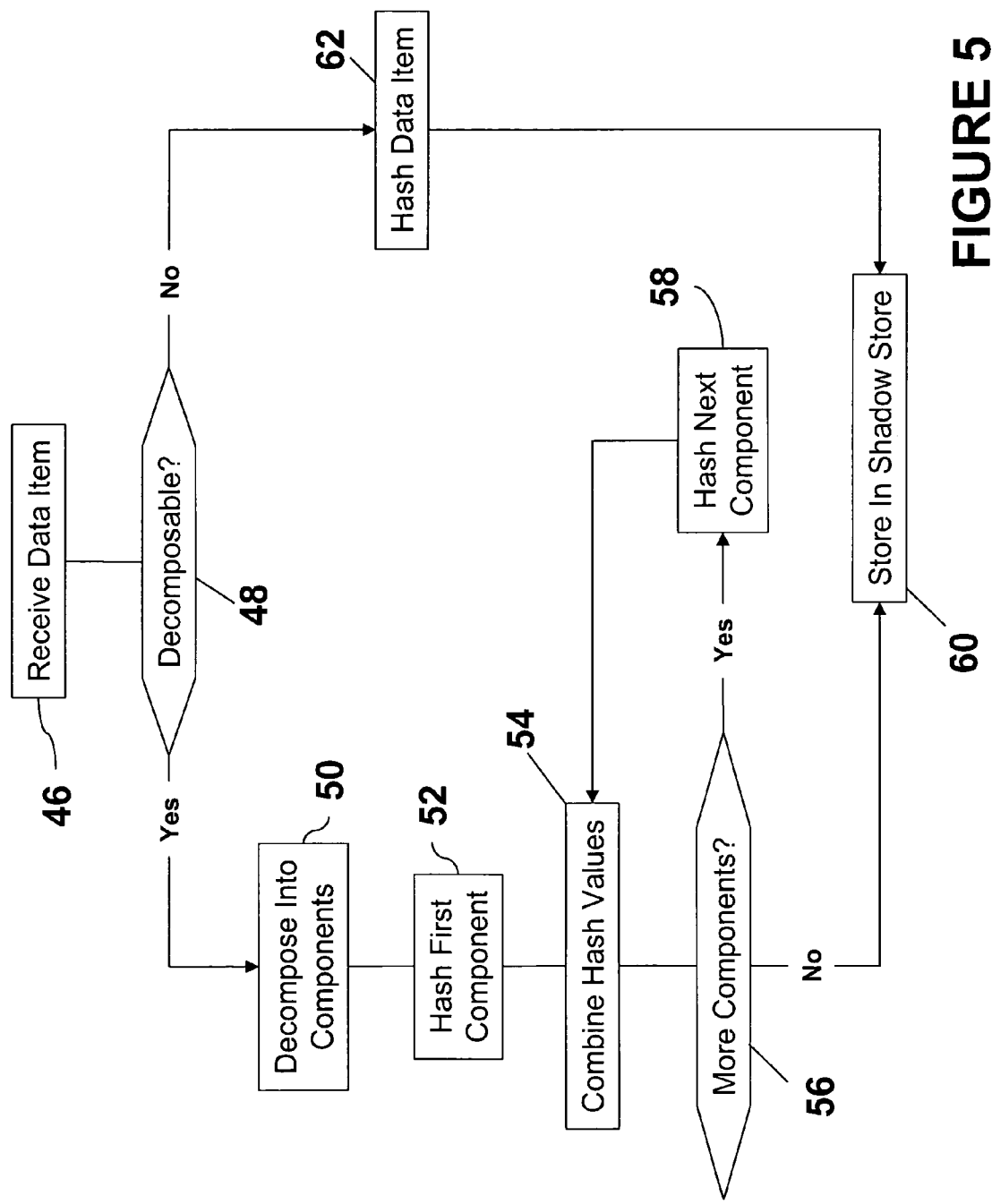
FIG. 5 is a flow diagram of an example process for maintaining the shadow store utilizing hash functions.

FIG. 5 is a flow diagram of an example process for maintaining the shadow store utilizing hash functions. As depicted in FIG. 5, data stored in a data store is hashed and the resulting hash values are stored in the shadow store. A data item is received at step 46. At step 48 it is determined if the data item is decomposable. A data items may comprise a hierarchical structure. For example, a file system can comprise folders and each folder can comprise files (and/or other folders). Thus, at step 48, for this example, if the data item is a folder, it would be determined if the folder could be decomposed into its constituent components (e.g., folder and files). The received data item can be decomposed to any appropriate level. Using the file system example, the data item could be decomposed into its constituent files. If the data item is decomposable (step 48), it is decomposed into components at step 50. Each component is hashed and the resultant hash values are combined. In an example embodiment, this is accomplished recursively, allowing for arbitrary levels of decomposition. At step 52, the first component is hashed resulting in a hash value indicative of the respective component. The hash value is combined with other hash values resulting from the data item at step 54. The combination operation can comprise any appropriate combination operation, concatenation, an exclusive or (XOR) operation, or a combination thereof, for example.

At step 56, it is determined if there are more components in the decomposition of the data item. If there are more components (step 50), the next component is hashed at step 58 and the resulting hash value is combined with the previous combined result at step 54. This recursive process (steps 54, 56, and 58) is continued until all components have been hashed and combined. If there or no more components (step 56), the resultant combined value is stored in the shadow store as shadow data at step 60.

In an example embodiment, the intermediate hash functions are concatenated. The result of this concatenation is then rehashed so that all data operated upon is of fixed size. In this example embodiment, the representations (e.g., the hash values) are recursively combined. Each decomposable item is decomposed until it is no longer decomposable. At this point, various combinations techniques are available for example, each decomposed item can be hashed resulting in a separate hash value for each decomposed item, all decomposed items can be hashed resulting in a single hash value, or a combination thereof. In an example embodiment, the most decomposed items are hashed. Then, all decomposed item hashes originating from a common decomposed parent are combined together. The decomposed items can be combined by various means, such as by concatenating and/or hashing for example. These combined items are then further combined with other items at the same level of the decomposition hierarchy, again by any of various appropriate means. This continues recursively until the top-level item decomposable item is reached.

If, at step 48, it is determined that the data item is not decomposable, the data item is hashed at step 62 and the resulting hash value is stored in the shadow store as shadow data at step 60.

Generally, to determine if a change has occurred in the limited/non-change-tracked data store, data items from the limited/non-change-tracked data store are hashed and the resultant hash values are compared to the hash values corresponding to the data time in the shadow data of shadow store. If the hash values match, no changes have occurred. If the hash values do not match, the data item is decomposed, if decomposable, and the components are hashed. The hash values of the components are compared with the hash values corresponding to the respective components in the shadow data of the shadow store. As mismatches are detected, the changes are synchronized with the change-tracked data store and the shadow data is updated. To synchronize from the change-tracked data store to the limited/non-change-tracked data store, data items reflecting changes from the change-tracked data store are applied to the limited/non-change-tracked data store. The data items from the change-tracked data store are hashed, and the resulting hash values are used to update the shadow data. In an example embodiment, the shadow data is updated during a successful synchronization of limited/non-change-tracked data store to ensure that the shadow data reflects the state of the limited/non-change-tracked data store as of the most recent synchronization operation.

Figure 6:
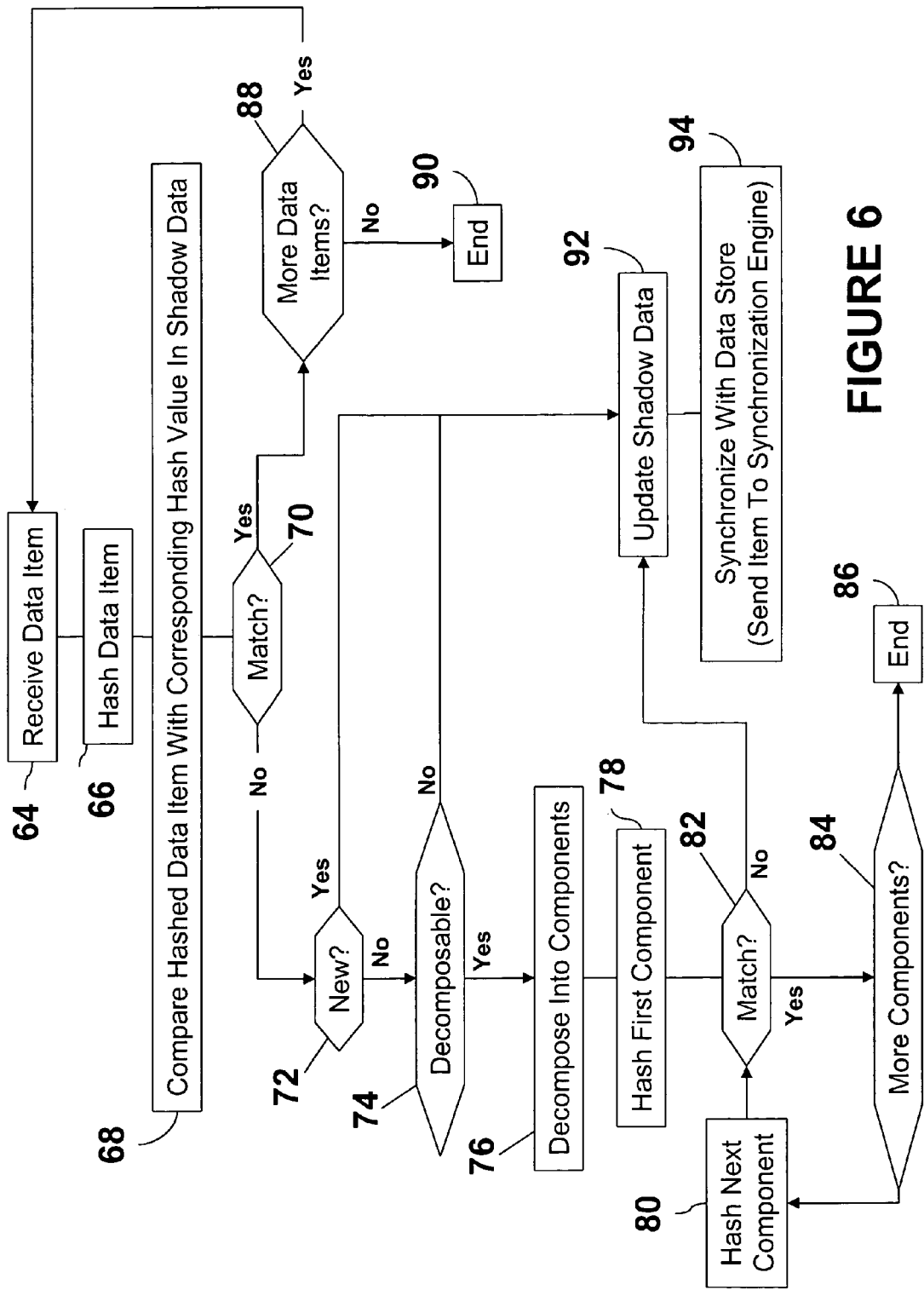
FIG. 6 is a flow diagram of an example process for determining changes in a data store.

FIG. 6 is a flow diagram of an example process for determining changes in a data store. A data item is received at step 64. The data item is hashed at step 66. The same hash function is used to hash data items from data stores as is used to hash data for storage as shadow data. This ensures that hashing the same input value results in the same hash (output) value. For example, if SHA-1 was used to generate hash values for storage in the shadow store (shadow data), SHA-1 would be used to hash the data item at step 66. The resulting hash value is compared with the corresponding hash value in the shadow data at step 68. This comparison can be accomplished in any appropriate manner. For example, the shadow store can comprise a mapping table, or the like, indexing all data items and respective components to the limited/non-change-tracked data store. When a data item is received from the limited/non-change-tracked data store, the mapping table can be consulted to determine if a corresponding data item is contained therein.

At step 70, it is determined if the hashed data item (from step 66) matches the corresponding hash value in the data store. If the hash values match (step 70), no change has occurred for the data item since the previous synchronization operation. It is determined if there are more data items at step 88. If there are no more data items (step 88), the process ends at step 90. If there are more data items (step 88), the process proceeds to step 64 and continues therefrom.

If, at step 70, the hash values do not match, it is determined, at step 72, if the data item is new. For example, the data item may not contain a corresponding index in a mapping table in the shadow store. If the data item is new (step 72), the shadow data is updated appropriately at step 92. That is, new data item is hashed, and if decomposable, the components are hashed, and the resulting hash values are stored in the shadow store as shadow data. The change is applied to the data store at step 94. In an example embodiment, the change along with any appropriate information is provided to a synchronization engine for synchronizing the data store.

If at step 72, the data item is determined not to be new, it is determined, at step 74, if the data item is decomposable. If the data item is not decomposable (step 74), the data store is appropriately updated with the changed data item at step 92. At this point, because the hash values did not match (step 70) and the data item is not new (step 72), it is assumed that a change has occurred to the data item. Accordingly, the shadow data is updated to reflect the change at step 92. In this case, the changed data item is hashed, and if decomposable, the components are hashed, and the resulting hash values are stored in the shadow store as shadow data. At step 94, the change is applied to the data store for synchronization.

If, at step 74, the data item is decomposable, the data item is decomposed into its respective components at step 74. The first component is hashed at step 78. It is determined, at step 82, if the resulting hash value matches a corresponding hash value in the shadow data. If there is a match, the implication is there has been no change to the component. It is determined, at step 84, if there are more components in the data item. If there are more data items (step 84), the next component is hashed at step 80, and the resulting hash value is compared (step 82) to the corresponding hash value in the shadow data. If there is no match, the implication is that a change has occurred to this data item. Accordingly, the shadow data is appropriately updated at step 92. The change is applied to the data store t step 94. The iterative process (steps 82, 84, and 80) continue, updating the shadow data and synchronized the data store as appropriate, until all components of the data item are checked. If, at step 84, the there are no more components, the process ends at step 86.

In an example embodiment, supported are limited/non-change tracked data stores in which some form of update or transformation is performed when a change is applied. For example, if one data store stores data in a specific format (e.g., 64 bit word length) and the other data store stores data in another format (e.g., 128 bit word length), data can be normalized to a specified form or length, truncated, or the like, when a change is applied. The transformation is transparent to a user, such the user is not aware that the transformation is taking place. Thus, received data is transformed to be compatible with the data store being updated. And, a representation (e.g., hash value) of the transformed data is stored in the shadow store. That is, modification to the enumerated change is made before acknowledgement, and the reported representation is saved in the shadowed data in lieu of the enumerated form.

Figure 7:
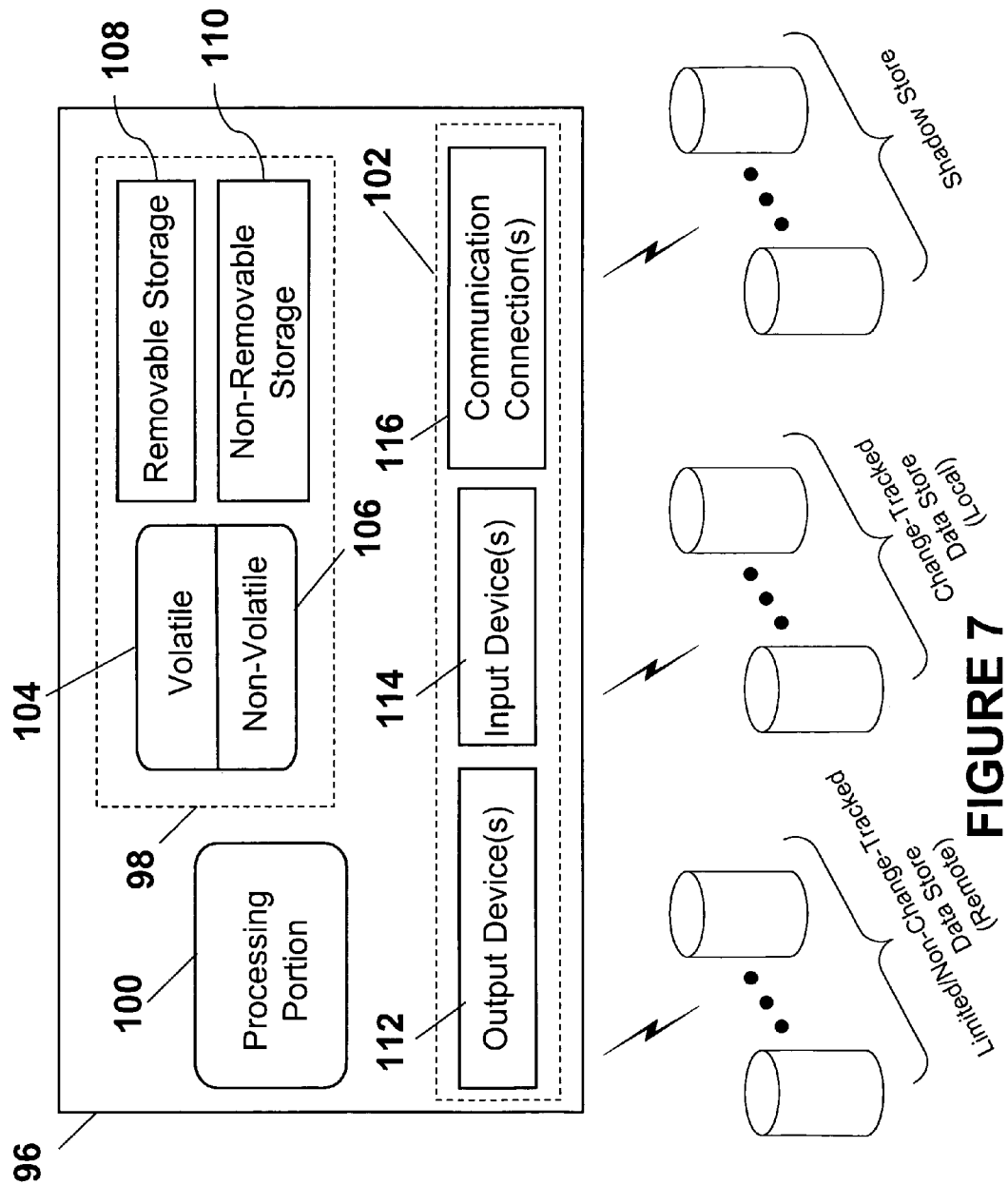
FIG. 7 is a diagram of an example computing device for synchronizing a change-tracked data store with a limited or non-change-tracked data store.

FIG. 7 is a diagram of an example computing device 96 for synchronizing a change-tracked data store with a limited or non-change-tracked data store. The computing device 96 comprises a processing portion 100, a memory portion 98, and an input/output portion 102. The processing portion 100, memory portion 98, and input/output portion 102 are coupled together (coupling not shown in FIG. 7) to allow communications therebetween. The computing device 96 is capable of performing the operations associated with synchronizing a change-tracked data store with a limited/non-change-tracked data store. For example, the processing portion 100 is capable of receiving data items from data stores, receiving data from the shadow store, decomposing data items, hashing data items and components of data items, comparing data items, comparing hash values, updating shadow data, and synchronizing data stores, for example. The memory portion 98 is capable of storing all parameters associated with synchronizing a change-tracked data store with a limited/non-change-tracked data store, such as data items, components of data items, hash values, or the like, for example. In an example configuration, the memory portion 98 comprises the limited/non-change-tracked data store, the change-tracked data store, the shadow store, or a combination thereof.

The input/output portion 102 is capable of providing and/or receiving data, as describe above, utilized to synchronizing a change-tracked data store with a limited/non-change-tracked data store n. The input/output portion 102 can provide data to and receive data from another computing device, a limited/non-change-tracked data store, a change-tracked data store, a shadow store, or a combination thereof.

Depending upon the exact configuration and type of processor, the memory portion 98 can be volatile (such as RAM and/or cache) 104, non-volatile (such as ROM, flash memory, etc.) 106, or a combination thereof. The computing device 96 can have additional features/functionality. For example, the computing device 96 can include additional storage (removable storage 108 and/or non-removable storage 110) including, but not limited to, magnetic or optical disks, tape, flash, smart cards or a combination thereof. Computer storage media, such as memory portion 98, 104, 106, 108, and 110, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the computing device 96. Any such computer storage media can be part of the computing device 96.

The computing device 96 also can contain communications connection(s) 116 that allow the computing device 96 to communicate with another computing device, a limited/non-change-tracked data store, a change-tracked data store, a shadow store, or a combination thereof. Communications connection(s) 116 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. The term computer readable media as used herein includes both storage media and communication media. The computing device 96 also can have input device(s) 114 such as keyboard, mouse, pen, voice input device, touch input device, etc. Output device(s) 112 such as a display, speakers, printer, etc. also can be included.

While it is envisioned that numerous embodiments of synchronizing a change-tracked data store with a limited/non-change-tracked data store are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for synchronizing a change-tracked data store with a limited/non-change-tracked data store, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for synchronizing a change-tracked data store with a limited/non-change-tracked data store.

The program(s) can be implemented in assembly or machine language, if desired. In any case, the language can be a compiled or interpreted language, and combined with hardware implementations. The methods and apparatuses for synchronizing a change-tracked data store with a limited/non-change-tracked data store also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for synchronizing a change-tracked data store with a limited/non-change-tracked data store. When implemented on a general-purpose processor, the program code combines with the processor to provide a unique apparatus that operates to invoke the functionality synchronizing a change-tracked data store with a limited/non-change-tracked data store. Additionally, any storage techniques used in connection with synchronizing a change-tracked data store with a limited/non-change-tracked data store can invariably be a combination of hardware and software.

While synchronizing a change-tracked data store with a limited or non-change-tracked data store has been described in connection with the example embodiments of the various figures, it is to be understood that other similar embodiments can be used or modifications and additions can be made to the described embodiments for performing the same functions for synchronizing a change-tracked data store with a limited or non-change-tracked data store without deviating therefrom. Therefore, synchronizing a change-tracked data store with a limited or non-change-tracked data store as described herein should not be limited to any single embodiment, but rather should be construed in breadth and scope in accordance with the appended claims.

What is claimed:

1. A method for synchronizing data stores, comprising:
   receiving a data item from a first data store, wherein a change to the data item in the first data store is not tracked by the first data store;
   generating a first representation of the received data item, wherein the first representation comprises other than an identical copy of the data item;
   retrieving, from a third data store, a second representation indicative of the received data item, wherein the second representation comprises other than an identical copy of the data item;
   comparing the first representation with the second representation;
   if the first representation differs from the second representation:
     updating the second representation to be indicative of the received data item;
     applying the received data item to a second data store; and
     storing the updated second representation in the third data store.

2. A method in accordance with claim 1, wherein:
   generating the first representation comprises operating on the received data item with a hash function for providing a first hash value;
   generating the second representation comprises operating on the received data item with a hash function for providing a second hash value; and
   comparing the first representation with the second representation comprises comparing the first hash value with the second hash value.

3. A method in accordance with claim 1, further comprising:
   receiving a plurality of data items from the first data store;
   operating on each data item of the received plurality of data items with a hash function to provide a respective plurality of hash values;
   combining the plurality of hash values;
   storing each value of the plurality of hash values in the third data store; and
   storing the combination of hash values in the third store.

4. A method in accordance with claim 3, wherein combining comprises at least one of performing an exclusive-or function, concatenating, and hashing.

5. A method in accordance with claim 1, wherein operations involving the third data store are transparent to a user.

6. A method in accordance with claim 1, further comprising:
   receiving a second data item from the second data store;
   applying the second data item to the first data store;
   if the second data item is successfully applied to the first data store:
     generating a representation of the second data item; and
     storing the representation of the second data item in the third data store.

7. A method in accordance with claim 1, further comprising:
   receiving a second data item from the second data store;
   transforming the received second data item;
   applying the transformed second data item to the first data store;
   if the transformed second data item is successfully applied to the first data store:
     generating a representation of the transformed second data item; and
     storing the representation of the transformed second data item in the third data store.

8. A method in accordance with claim 1, further comprising:
   if the received data item is decomposable, decomposing the received data item into a plurality of components;
   generating a respective first plurality of representations for each component of the plurality of components;
   retrieving, from the third data store, a second plurality of representations respectively indicative of the plurality of components;
   comparing each of the first plurality of representations with the second plurality of representations; and
   for each representation of the first plurality of representations that differs from a respective representation of the second plurality of representations;
     updating the respective representation of the second plurality of representations to be indicative of a respective component of the plurality of components decomposed from the received data item;
     applying the respective components of the received data item to the second data store; and
     storing the respective updated second representation in the third data store.

9. A method in accordance with claim 8, wherein:
   if a component is decomposable, decomposing the component into a plurality of subcomponents;
   if a subcomponent is decomposable, decomposing the subcomponent into a next level of subcomponents;
   decomposing all subcomponents in all levels until each subcomponent is no longer decomposable; and
   for each subcomponent:
     generating a first subcomponent representation indicative of a respective subcomponent;
     retrieving, from the third data store, a second subcomponent representation indicative of the respective subcomponent;
     comparing the first subcomponent representation with the second subcomponent representation;
     if the first subcomponent representation differs from the second subcomponent representation:
       updating the second subcomponent representation to be indicative of the respective subcomponent;
       applying the respective subcomponent to the second data store; and
       storing the updated second subcomponent representation in the third data store.

10. A method in accordance with claim 9, further comprising:
 if at least one of a first subcomponent and a respective second subcomponent is decomposable, and if a comparison of respective representations thereof indicates a difference, comparing respective representations of subcomponents at a next subcomponent level.

11. A method in accordance with claim 8, further comprising:
 storing in the third data store at least one of:
 for each subcomponent, a hash value respectively indicative of each subcomponent;
 a hash value indicative of all subcomponents; and
 a hash value indicative of a combination of subcomponents.

12. A method in accordance with claim 1, wherein:
 the first data store comprises a plurality of data items; and
 the plurality of data items in the first data store is partially change-tracked.

13. A system for synchronizing data stores, the system comprising:
 an input/output portion for:
  receiving a data item from a first data store, wherein a change to the data item in the first data store is not tracked by the first data store; and
  receiving, from a third data store, a second representation indicative of the received data item, wherein the second representation comprises other than an identical copy of the data item;
 a processor portion for:
  generating a first representation of the received data item, wherein the first representation comprises other than an identical copy of the data item;
  comparing the first representation with a second representation indicative of the received data item; and
  if the first representation differs from the second representation:
   updating the second representation to be indicative of the received data item;
   applying the received data item to a second data store; and
   storing the updated second representation in the third data store.

14. A system in accordance with claim 13, wherein:
 generating the first representation comprises operating on the received data item with a hash function for providing a first hash value;
 generating the second representation comprises operating on the received data item with a hash function for providing a second hash value; and
 comparing the first representation with the second representation comprises comparing the first hash value with the second hash value.

15. A system in accordance with claim 13:
 the input/output portion further for:
  receiving a plurality of data items from the first data store; and
 the processor portion further for:
  operating on each data item of the received plurality of data item with a hash function to provide a respective plurality of hash values;
  combining the plurality of hash values; and
  storing the combination of hash values in the third data store.

16. A system in accordance with claim 13:
 the input/output portion further for:
  receiving a second data item from the second data store; and
 the processor portion further for:
  if needed for compatibility with the first data store, transforming the received second data item;
  applying one of the second data item and the transformed second data item to the first data store;
  if the one of the second data item and the transformed second data item is successfully applied to the first data store:
   generating a representation of the one of the second data item and the transformed second data item; and
   storing the representation of the one of the second data item and the transformed second data item in the third data store.

17. A system in accordance with claim 13, the processor portion further for:
 if the received data item is decomposable, decomposing the received data item into a plurality of components;
 if a component is decomposable, decomposing the component into a plurality of subcomponents;
 if a subcomponent is decomposable, decomposing the subcomponent into a next level of subcomponents;
 decomposing all subcomponents in all levels until each subcomponent is no longer decomposable; and
 for each subcomponent:
  generating a first subcomponent representation indicative of a respective subcomponent;
  retrieving, from the third data store, a second subcomponent representation indicative of the respective subcomponent;
  comparing the first subcomponent representation with the second subcomponent representation;
  if the first subcomponent representation differs from the second subcomponent representation:
   updating the second subcomponent representation to be indicative of the respective subcomponent;
   applying the respective subcomponent to the second data store; and
   storing the updated second subcomponent representation in the third data store.

18. A system in accordance with claim 17, the processor portion further for:
 if at least one of a first subcomponent and a respective second subcomponent is decomposable, and if a comparison of respective representations thereof indicates a difference, comparing respective representations of subcomponents at a next subcomponent level.

19. A system in accordance with claim 13, the processor portion further for:
 storing in the third data store at least one of:
 for each subcomponent, a hash value respectively indicative of each subcomponent;
 a hash value indicative of all subcomponents; and
 a hash value indicative of a combination of subcomponents.

20. A computer-readable storage medium having computer-executable instructions stored thereon for synchronizing data stores, the computer-executable instructions for performing the steps of:
 receiving a data item from a first data store, wherein a change to the data item in the first data store is not tracked by the first data store;
 generating a first representation of the received data item, wherein the first representation comprises other than an identical copy of the data item;

retrieving, from a third data store, a second representation indicative of the received data item, wherein the second representation comprises other than an identical copy of the data item;
comparing the first representation with the second representation;
if the first representation differs from the second representation:

updating the second representation to be indicative of the received data item;
applying the received data item to a second data store; and
storing the updated second representation in the third data store.

* * * * *